United States Patent
Homa et al.

(10) Patent No.: US 8,265,441 B2
(45) Date of Patent: Sep. 11, 2012

(54) HYDROGEN-RESISTANT OPTICAL FIBER/GRATING STRUCTURE SUITABLE FOR USE IN DOWNHOLE SENSOR APPLICATIONS

(75) Inventors: Daniel Scott Homa, Blacksburg, VA (US); Brooks Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 1509 days.

(21) Appl. No.: 11/807,151

(22) Filed: May 25, 2007

(65) Prior Publication Data

US 2011/0293232 A1 Dec. 1, 2011

(51) Int. Cl.
*G02B 6/036* (2006.01)
*G02B 6/34* (2006.01)
(52) U.S. Cl. ............... 385/126; 385/37; 385/123
(58) Field of Classification Search ........... 385/37, 385/123, 124, 126, 127
See application file for complete search history.

(56) References Cited

U.S. PATENT DOCUMENTS

| | | | |
|---|---|---|---|
| 5,596,668 A | 1/1997 | DiGiovanni et al. | |
| 5,838,866 A * | 11/1998 | Antos et al. | 385/127 |
| 6,104,852 A * | 8/2000 | Kashyap | 385/123 |
| 6,128,928 A * | 10/2000 | Antos et al. | 65/398 |
| 6,160,944 A * | 12/2000 | Payne et al. | 385/129 |
| 6,201,917 B1 | 3/2001 | Campion et al. | |
| 6,321,007 B1 | 11/2001 | Sanders | |
| 6,456,771 B1 | 9/2002 | Sanders | |
| 6,600,857 B1 | 7/2003 | Abe et al. | |
| 6,636,684 B1 | 10/2003 | Paek et al. | |
| 6,647,190 B2 | 11/2003 | Matsuo et al. | |
| 6,842,566 B2 | 1/2005 | Ishikawa et al. | |
| 6,853,798 B1 | 2/2005 | Weiss | |
| 6,856,739 B2 | 2/2005 | Zhang et al. | |
| 6,915,686 B2 | 7/2005 | Baustad | |
| 6,944,382 B2 | 9/2005 | Berkey et al. | |
| 6,947,650 B1 | 9/2005 | Homa | |
| 6,993,241 B2 | 1/2006 | Bagnasco et al. | |
| 7,257,301 B2 * | 8/2007 | Homa et al. | 385/123 |
| 7,493,009 B2 * | 2/2009 | Homa | 385/142 |
| 7,526,160 B1 * | 4/2009 | Homa et al. | 385/37 |
| 7,752,870 B1 * | 7/2010 | Homa | 65/417 |
| 2003/0213268 A1 * | 11/2003 | Homa | 65/390 |
| 2006/0222306 A1 | 10/2006 | Homa et al. | |
| 2008/0292256 A1 * | 11/2008 | Homa | 385/127 |

FOREIGN PATENT DOCUMENTS

EP 0772061 5/1997

* cited by examiner

*Primary Examiner* — Rhonda Peace
(74) *Attorney, Agent, or Firm* — Wendy W. Koba

(57) ABSTRACT

A hydrogen-resistant optical fiber particularly well-suitable for downhole applications comprises a relatively thick pure silica core and a depressed-index cladding layer. Interposed between the depressed-index cladding layer and the core is a relatively thin germanium-doped interface. By maintaining a proper relationship between the pure silica core diameter and the thickness of the germanium-doped interface, a majority (preferably, more than 65%) of the propagating signal can be confined within the pure silica core and, therefore, be protected from hydrogen-induced attenuation problems associated with the presence of germanium (as is common in downhole fiber applications). The hydrogen-resistant fiber of the present invention can be formed to include one or more Bragg gratings within the germanium-doped interface, useful for sensing applications.

9 Claims, 6 Drawing Sheets

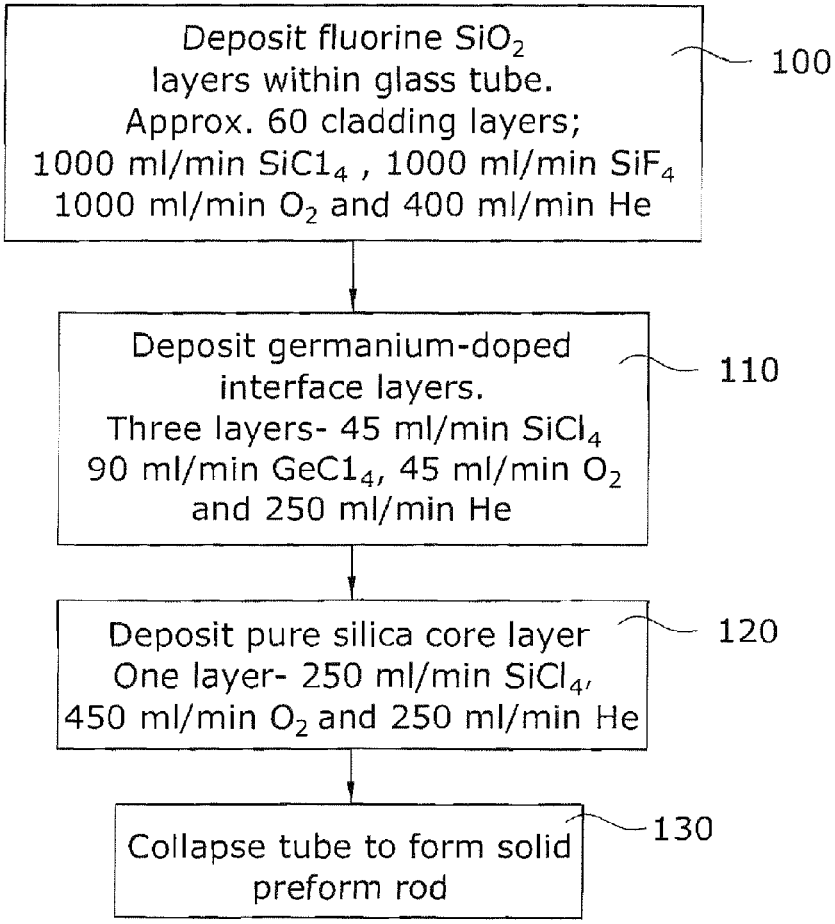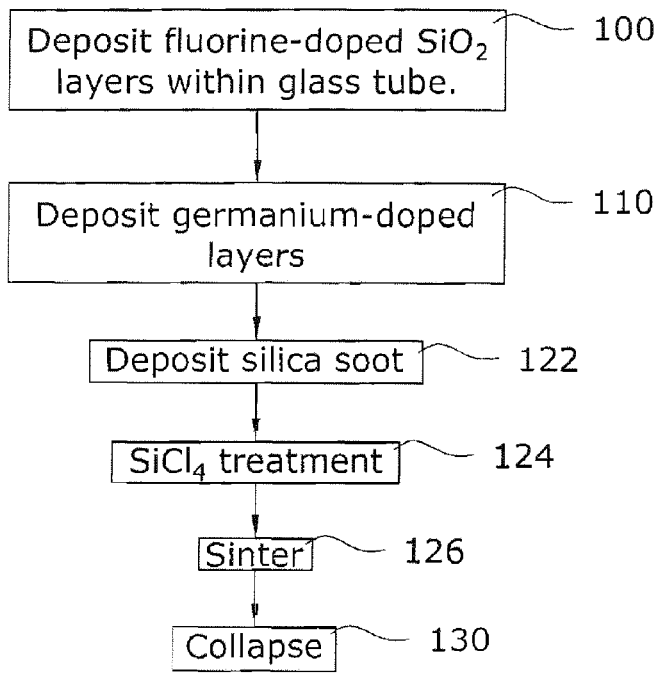

HYDROGEN-RESISTANT OPTICAL FIBER/GRATING STRUCTURE SUITABLE FOR USE IN DOWNHOLE SENSOR APPLICATIONS

TECHNICAL FIELD

The present invention relates to a hydrogen-resistant optical fiber including a germanium-doped core/cladding interface that provides for a relatively stable silica glass matrix in the presence of hydrogen.

BACKGROUND OF THE INVENTION

One of the niche applications for fiber optics is as a sensor for "downhole" applications, such as monitoring a geothermal well, oil well, or the like. Downhole measurements permit the operator to monitor multiphase fluid flow, as well as pressure and temperature. Downhole measurements of pressure, temperature and fluid flow play an important role in managing various types of sub-surface reservoirs.

Historically, the monitoring systems have been configured to provide an electrical line that allows the measuring instruments, or sensors, to send measurements to the surface. Recently, fiber optic sensors have been developed that communicate readings from a wellbore to optical signal processing equipment located at the surface. The fiber optic sensors may be variably located within the wellbore. For example, optical sensors may be positioned on the outer surface of a submersible electrical pump and used to monitor the performance of the pump. Fiber optic sensors may also be disposed along the tubing within a wellbore. In either instance, a fiber optic cable is run from the surface to the downhole sensing apparatus. The fiber optic cable transmits optical signals to an optical signal processor at the surface which is then used to determine environmental information (such as temperature and/or pressure) associated with the wellbore.

With respect to geothermal wells, a fiber optic sensor may be used to obtain a temperature profile along the depth of the well. It is well known in the art that a vertical temperature profile of an entire geothermal well can be obtained essentially instantaneously using a single optical fiber. Inasmuch as the intensity of various frequency components of backscattered light within the optical fiber depend upon the temperature of the medium at the point where the backscattered light is generated, proper detection and analysis of the entire backscattered radiation spectrum will yield the desired temperature profile.

However, field tests of optical fiber distributed temperature sensors have demonstrated that conventional optical fibers are insufficiently robust for this type of application. In "hot" well studies, anomalies associated with changes in the optical transmission characteristics of the studied optical fibers began to appear within the first twenty-four hours of the test period. Inasmuch as it is desired to deploy these optical fiber sensors for long periods of time, this type of change is unacceptable.

At least a portion of the anomalies have been associated with the formation of OH ions (and other hydrogen-related moieties) in the silicate glass matrix of the optical fibers. The OH ions do not exist in the optical fiber prior to its exposure to the "downhole" environment. The likely degradation mechanism is that hydrogen in the hot downhole environment diffuses into the fiber, and within the fiber the hydrogen reacts with the oxygen of the silicate glass to form OH ions.

The constituents of the glass have been found to have a strong influence on the rate at which OH ions are formed in a typical downhole environment. Optical fibers typically have a core glass with a refractive index value that is greater than the refractive index value of a surrounding cladding glass, so as to maintain confinement of the propagating optical signal within the core area. An optical fiber may have what is referred to as a "step-index" structure, where there is essentially an abrupt interface between the core and cladding glasses, or alternatively, a "graded-index" structure, where there is a gradual change in refractive index in a radial direction from the center of the core. It is common, in either case, to introduce germanium into the core area to increase its refractive index. It has been found, however, that the presence of germanium promotes the formation of OH ions in the downhole environment.

Thus, a need remains in the art for an effective optical fiber sensor for downhole applications that remains stable within a hydrogen-rich environment, even at elevated temperatures.

SUMMARY OF THE INVENTION

The need remaining in the art is addressed by the present invention, which relates to a hydrogen-resistant optical fiber including germanium-doped core/cladding interface that provides for a relatively stable silica glass matrix in the presence of hydrogen.

In accordance with the present invention, the central portion of the core structure is "germanium-free", pure silica. As such, there is little or no opportunity for OH ions to be created. The germanium-doped core/cladding interface region is formed to comprise only a small fraction of the core diameter and, therefore, interacts with only a relatively small percentage of the fundamental signal mode propagating through the core (for example, less than 90% of the fundamental mode). This limited interaction is sufficient to significantly minimize the deleterious effects of hydrogen-induced attenuation. Any hydrogen that is present will react with the germanium present in the core/cladding interface and thus remain separated from the pure silica interior region of the core. A fluorine-doped cladding layer is formed to surround the germanium-doped core/cladding interface.

In a preferred embodiment of the present invention, the hydrogen-resistant fiber comprises a relatively thick pure silica core, with several separate layers of germanium-doped glass formed to surround the pure silica core. Inasmuch as the core is relatively thick, only a small portion of germanium dopant will migrate into the core region.

In a preferred method of making the hydrogen-resistant fiber of the present invention, an MCVD technique is used, starting with the deposition of the fluorine-doped depressed cladding layer, followed by the deposition of the several germanium-doped layers, with a pure silica core layer deposited thereafter. The preform tube is then collapsed to form the solid core region, with the surrounding germanium-doped core/cladding interface and the fluorine-doped depressed cladding layer surrounding the interface.

In a further embodiment of the present invention, a Bragg grating may be written in the fiber as it is being drawn, where the grating will be formed in the interface region (requiring the presence of germanium to form the grating structure). There are many downhole sensor applications that utilize the reflective properties of a Bragg grating to measure temperature and/or pressure along the depth of the wellbore.

Other and further embodiments and aspects of the present invention will become apparent during the course of the following discussion and by reference to the accompanying drawings.

BRIEF DESCRIPTION OF THE DRAWINGS

Referring now to the drawings,

FIG. 4 is a flowchart of an exemplary process for forming the hydrogen-resistant fiber of the present invention;

FIG. 5 is a flowchart of an alternative process for forming the hydrogen-resistant fiber of the present invention;

FIG. 9(a) is a plot of a plurality of gratings formed along a length of hydrogen-resistant fiber of the present invention and FIG. 9(b) is a plot of the frequency response for an exemplary grating.

DETAILED DESCRIPTION

Figure 1:
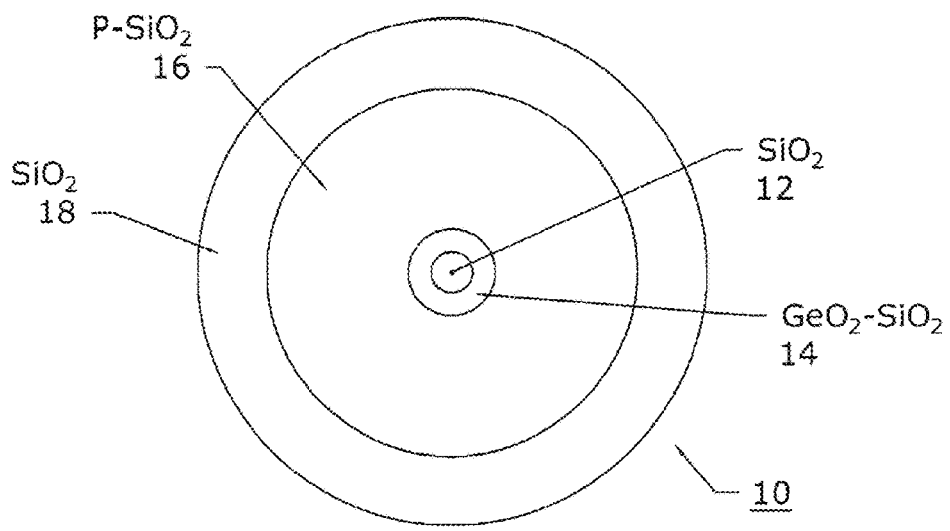
FIG. 1 is a cut-away side view of a hydrogen-resistant optical fiber formed in accordance with the present invention.

FIG. 1 contains a cross-sectional view of an exemplary hydrogen-resistant optical fiber 10 for downhole sensor applications formed in accordance with the present invention. As shown in FIG. 1, fiber 10 comprises a pure silica core 12, a surrounding germanium-doped core/cladding interface region 14, a fluorine-doped depressed cladding layer 16 and an outer cladding layer 18. In accordance with the present invention, Ge-doped interface region 14 is relatively thin, with silica core 12 comprising the majority of the core area (preferably, over 65% of the core comprises pure silica). Therefore, the majority of the optical signal will be propagating within the pure silica core region and not be affected by any hydrogen-associated losses within Ge-doped interface region 14, where only a "tail" portion of the optical energy will reside. Interface region 14 may also be doped with, for example, one of Sb, Hf, Ta, P, Al, S, Bi, Pb, In, Ga and La.

Figure 2:
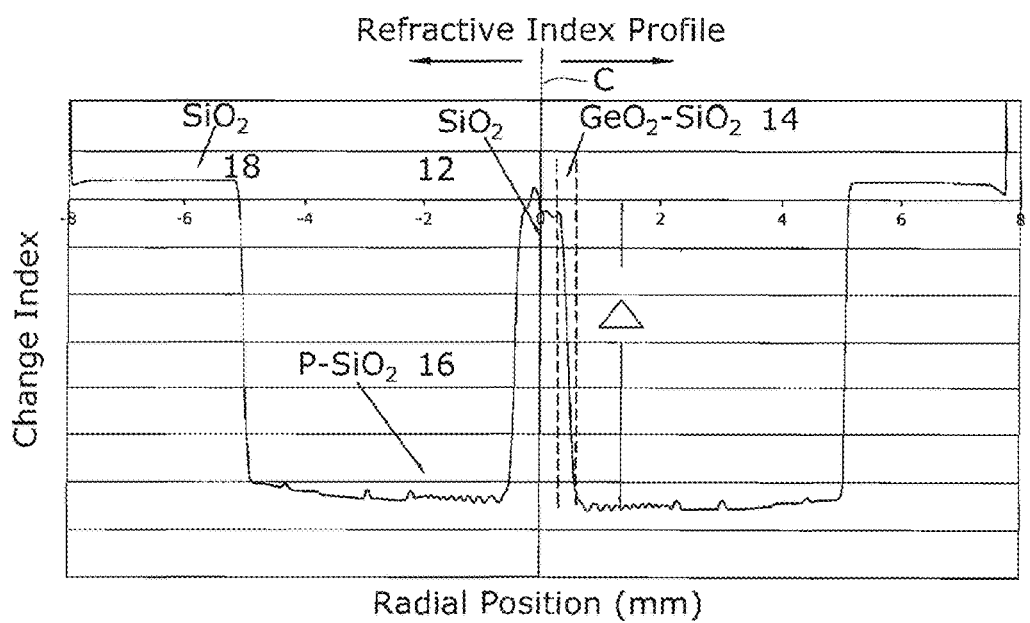
FIG. 2 is a graph of the refractive index profile for the hydrogen-resistant fiber of FIG. 1.

The fluorine dopant in cladding layer 16 is used to decrease the refractive index value of fiber 10 with respect to the refractive index value of core 12. The refractive index value of outer cladding layer 18 is greater than that of depressed cladding layer 16. FIG. 2 contains a graph of the refractive index of hydrogen-resistant fiber 10, measured outward in a radial direction from the center C of core 12. The difference in refractive index between silica core 12/Ge-doped interface region 14 and F-doped depressed cladding layer 16 is denoted as "Δ" in FIG. 2.

Figure 3:
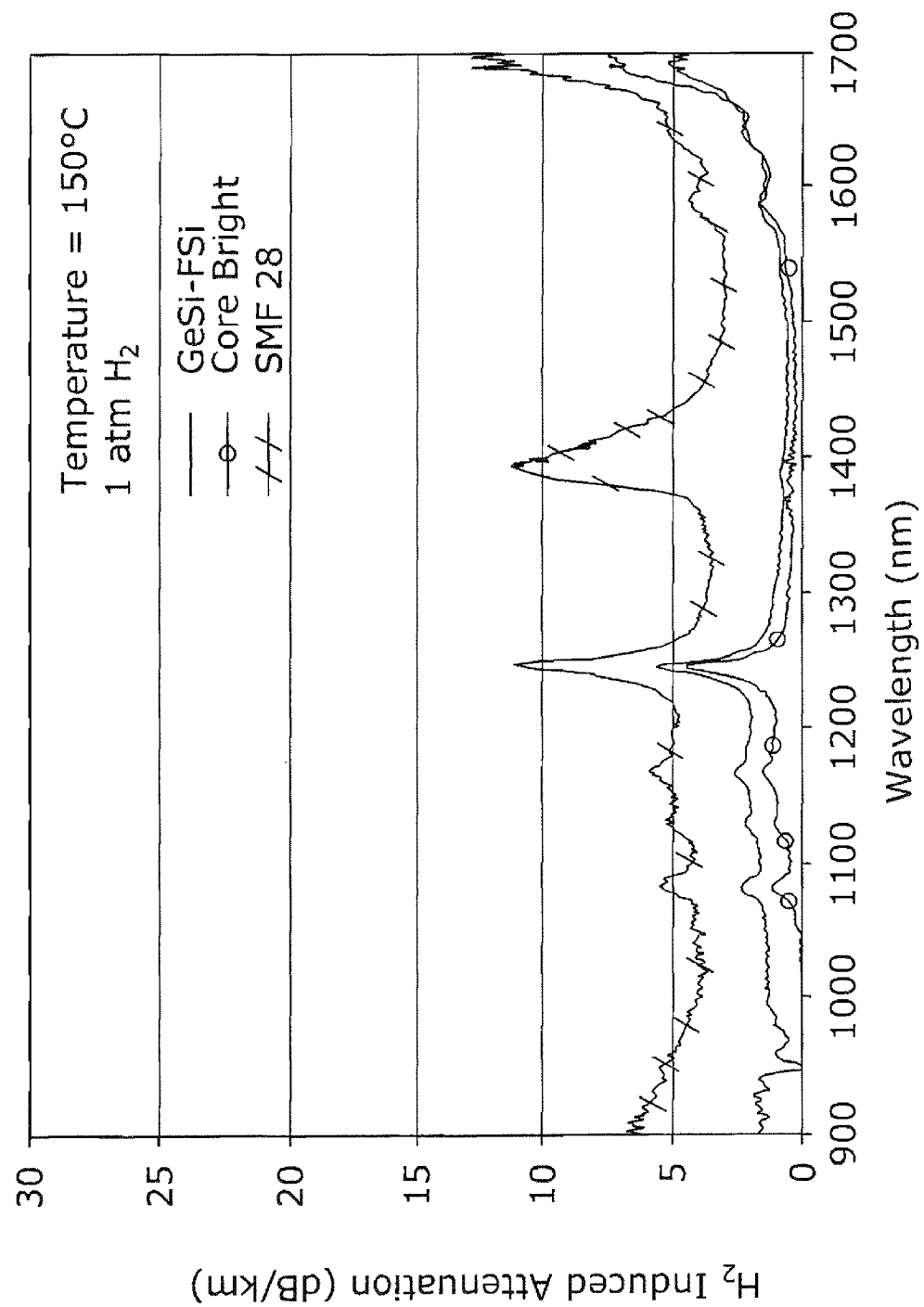
FIG. 3 contains a plot comparing the hydrogen-induced attenuation for the fiber of the present invention to various prior art fiber compositions.

FIG. 3 contains a graph of hydrogen-induced attenuation, comparing the attenuation values of inventive fiber 10 with two different prior art fibers, a conventional downhole sensor fiber including a Bragg grating (denoted as "sensor" in the graph legend) and a "defect-free" pure silica core single mode fiber. For various reasons unrelated to hydrogen sensitivity, "defect-free" pure silica core single mode fiber is not suitable for downhole sensor applications. As shown, the attenuation achieved with inventive fiber 10 is significantly improved over that associated with the conventional Bragg grating sensor fibers, approaching the optimal value associated with the "defect-free" pure silica core single mode fiber. Indeed, the attenuation associated with inventive fiber 10 maintains a value well below 2 dB/km at most sensor-associated wavelengths (e.g., 1300-1600 nm). Inasmuch as the germanium-doped interface comprises only a minimal amount of the core area (no more than 35%, and preferably even less), the majority of the optical signal will propagate unaffected within the pure silica core region.

Optical fibers, including inventive hydrogen-resistant fiber 10 of the present invention, are generally made by chemical processes. A particularly useful process is known in the art as modified chemical vapor deposition (MCVD), and FIG. 4 contains a flowchart of an exemplary set of MCVD process steps that may be used to form hydrogen-resistant fiber 10 of the present invention. Referring to FIG. 4, the process begins at step 100 with fluorine-doped $SiO_2$ being deposited within a glass tube (where the glass tube will eventually form outer cladding layer 18 of fiber 10). In one particular MCVD process, a plurality of separate gases are flowed through glass tube so as to form multiple layers of fluorine-doped glass. In order to form a relatively thick depressed cladding layer (see FIGS. 1 and 2), a large number of layers are formed. In one exemplary embodiment, thirty to sixty separate F-doped layers may be deposited on the inner wall of a glass tube (other suitable numbers of layers being possible, as a function of the dimensions of the deposition tube, desired fiber geometry, and the like). Table I includes the particular gasses and flow rates associated with forming F-doped depressed cladding layer 16.

TABLE I

| Gas | Flow Rate (ml/min) |
| --- | --- |
| $SiCl_4$ | 1000 |
| $SiF_4$ | 1000 |
| $O_2$ | 1000 |
| He | 400 |

The exemplary MCVD process then continues at step 110 by depositing the germanium-doped layers forming Ge-doped interface region 14 on the exposed surface of the deposited F-doped material within the tube. In order to maintain this region relatively thin, only a few layers are deposited, where three layers have been found to be suitable for most applications. Table II includes the particular gasses and flow rates associated with forming Ge-doped interface region 14.

TABLE II

| Gas | Flow Rate (ml/min) |
| --- | --- |
| $SiCl_4$ | 45 |
| $GeCl_4$ | 90 |
| $O_2$ | 45 |
| He | 250 |

Following the deposition of the Ge-doped interface region, the core area of inventive fiber 10 is formed by depositing a single layer of silica (shown as step 120 in FIG. 4). In accordance with the present invention, the pure silica core layer is deposited to comprise a thickness significantly greater than the Ge-doped layers (as shown in FIG. 1 in particular). Table III includes the particular gasses and flow rates associated with forming pure silica core 12.

TABLE III

| Gas | Flow Rate (ml/min) |
| --- | --- |
| SiCl$_4$ | 260 |
| O$_2$ | 450 |
| He | 250 |

The final step in the formation of an optical fiber "preform" using an MCVD process, shown as step 130 in FIG. 4, is to collapse the tube (using a heat process, for example) to form a solid core preform from which an optical fiber may then be drawn down in conventional fashion.

It is believed that the germanium within interface region 14 diffuses inward toward the center of core region 12, and also outward into fluorine-doped cladding region 16. It is further envisioned that a portion of the fluorine diffuses into interface region 14, reducing its refractive index to a value close to that of pure silica. As a result, interface region 14 becomes indistinguishable from pure silica core region 12 in terms of its refractive index value.

FIG. 5 contains a flowchart of an alternative MCVD process that may be used to form inventive fiber 10 of the present invention. In this, initial steps 100 and 110 remain the same, with the deposition of the pure silica core material in step 120 replaced by a three-step process including: (1) depositing silica soot (step 122), (2) treating the soot in a gaseous solution of SiCl$_4$ with minimal or no oxygen (step 124), and (3) sintering the saturated soot to form the pure silica material (step 126). The final step in the process is the same as that shown in the flowchart of FIG. 4, to collapse the MCVD-produced tube into a solid core preform (step 130).

While up to this point, the description of the present invention has concentrated on the composition and fabrication process of relatively stable hydrogen-resistant fiber, a fiber Bragg grating may also be formed within the same structure, where the grating is "written" into the Ge-doped interface region 14. Fiber Bragg gratings are of particular interest in downhole applications as a distributed sensor. Fiber optic Bragg grating sensors have been used to measure the longitudinal and transverse strain, as well as longitudinal strain and temperature. In particular, changes in ambient temperature will result in shifting the reflective wavelength of the grating structure in a known fashion. Therefore, by monitoring the reflected wavelength, the downhole temperature may be measured. Changes in pressure induce a different modification/shift of the center wavelength of a Bragg grating and is another useful downhole measurement.

Figure 6:
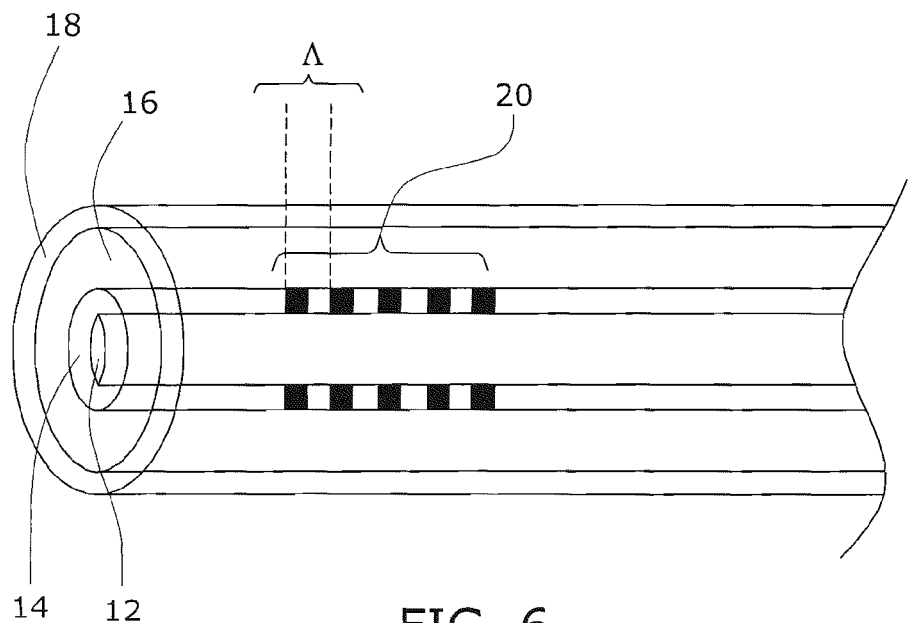
FIG. 6 is an isometric cross-sectional view of the hydrogen-resistant fiber of the present invention formed to include at least one Bragg grating along the germanium-doped interface thereof.

FIG. 6 contains a cut-away isometric view of hydrogen-resistant fiber 10 of the present invention include a Bragg grating structure 20 formed within Ge-doped interface region 14. As is well-known in the art, a Bragg structure may be formed along a predetermined length of a section of optical fiber by using a controlled UV exposure that functions to alter the refractive index of the fiber in a periodic fashion. In this case, Bragg grating structure 20 is formed to comprise a grating period denoted "Λ". It is to be understood that multiple Bragg gratings of differing periodicities may be written in the same fiber (either physically overlapping or sequentially formed along the fiber) to perform a number of different measurements.

It is an advantage of the structure of the inventive fiber that the Bragg grating is formed in the relatively thin Ge-doped interface region 14, where a sufficient energy of propagating optical signal is present to perform the monitoring function without interrupting the propagating of the majority of the optical signal along core 12.

Figure 7:
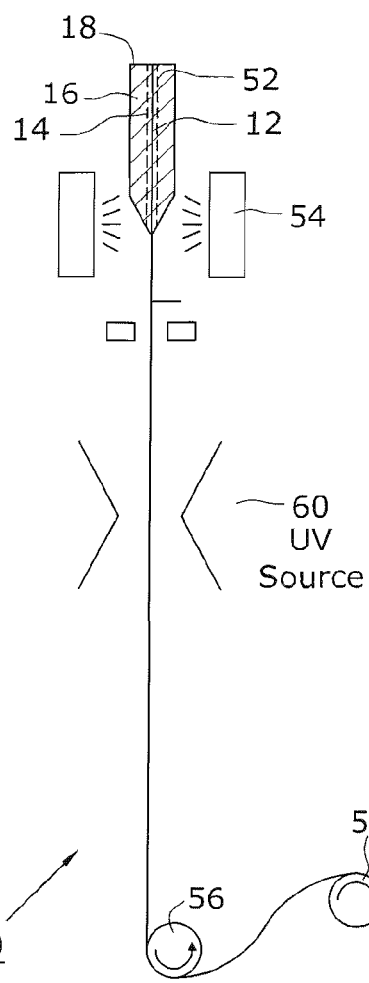
FIG. 7 illustrates an exemplary draw tower arrangement for forming an optical fiber from a preform, the illustration including a UV radiation source used to form a Bragg grating as the fiber is being drawn.

In one exemplary process, Bragg grating structures 20 may be formed within Ge-doped interface region 14 as the optical is being drawn down from the solid core preform. FIG. 7 illustrates, in a simplified view, an exemplary draw tower 50, where a solid core preform 52 is first passed through a high temperature furnace 54 to "melt" the preform and allow a glass fiber to be drawn. The drawn fiber then follows a downward path to a capstan 56 and take-up spool 58, where the tension/pull associated with capstan 56 and take-up spool 58 (as well as their speed) controls the drawing process. In accordance with the present invention, a UV source 60 is disposed at a predetermined position along the downward path of the drawing fiber to allow for the desired grating pattern to be "written" in Ge-doped interface region 14 as the fiber passes through source 60. Advantageously, the UV radiation will pass unimpeded through F-doped depressed cladding 16, allowing for the grating to form only in Ge-doped region 14.

Figure 8:
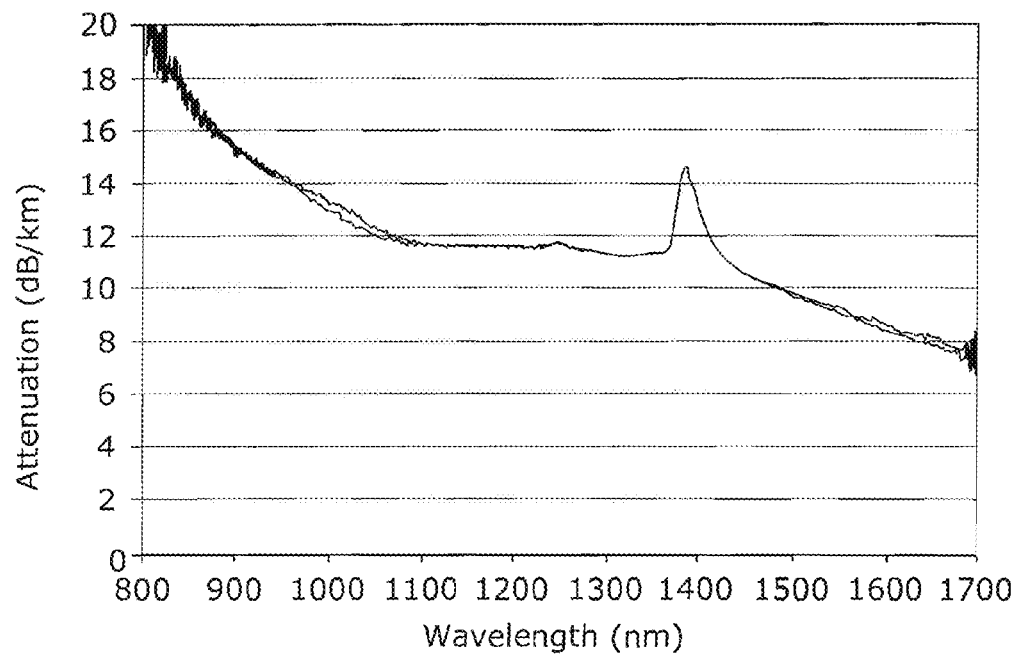
FIG. 8 is a plot of the hydrogen-induced attenuation associated with a fiber Bragg grating structure formed in accordance with the present invention.
Figure 10:
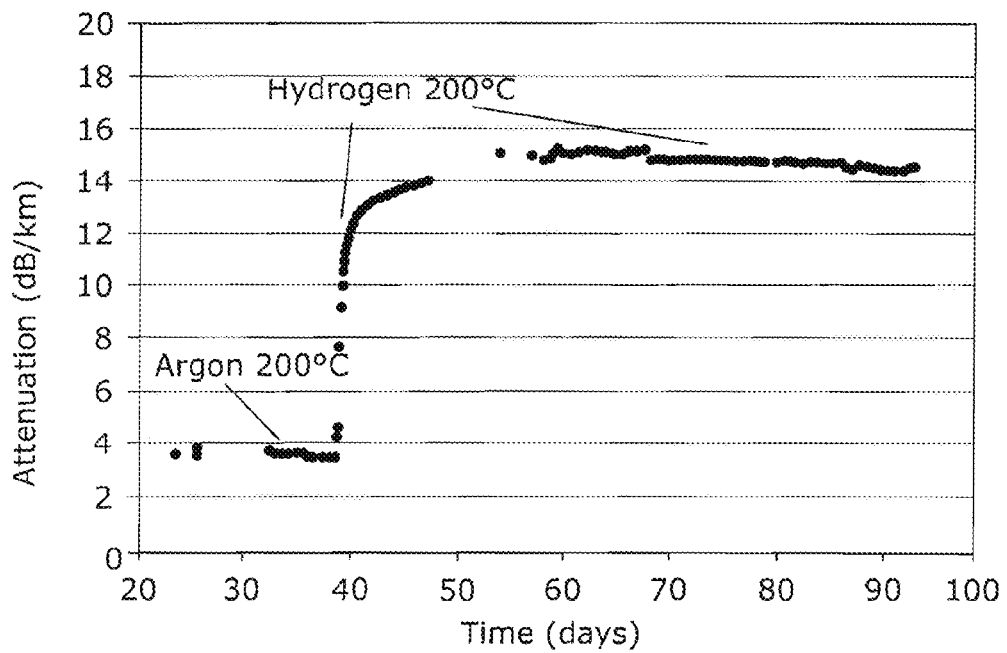
FIG. 10 is a plot illustrating the changes in hydrogen-induced attenuation as a function of time for the inventive fiber of the present invention, illustration the saturation of the loss at a value of approximately 15 dB/km.
Figure 9:
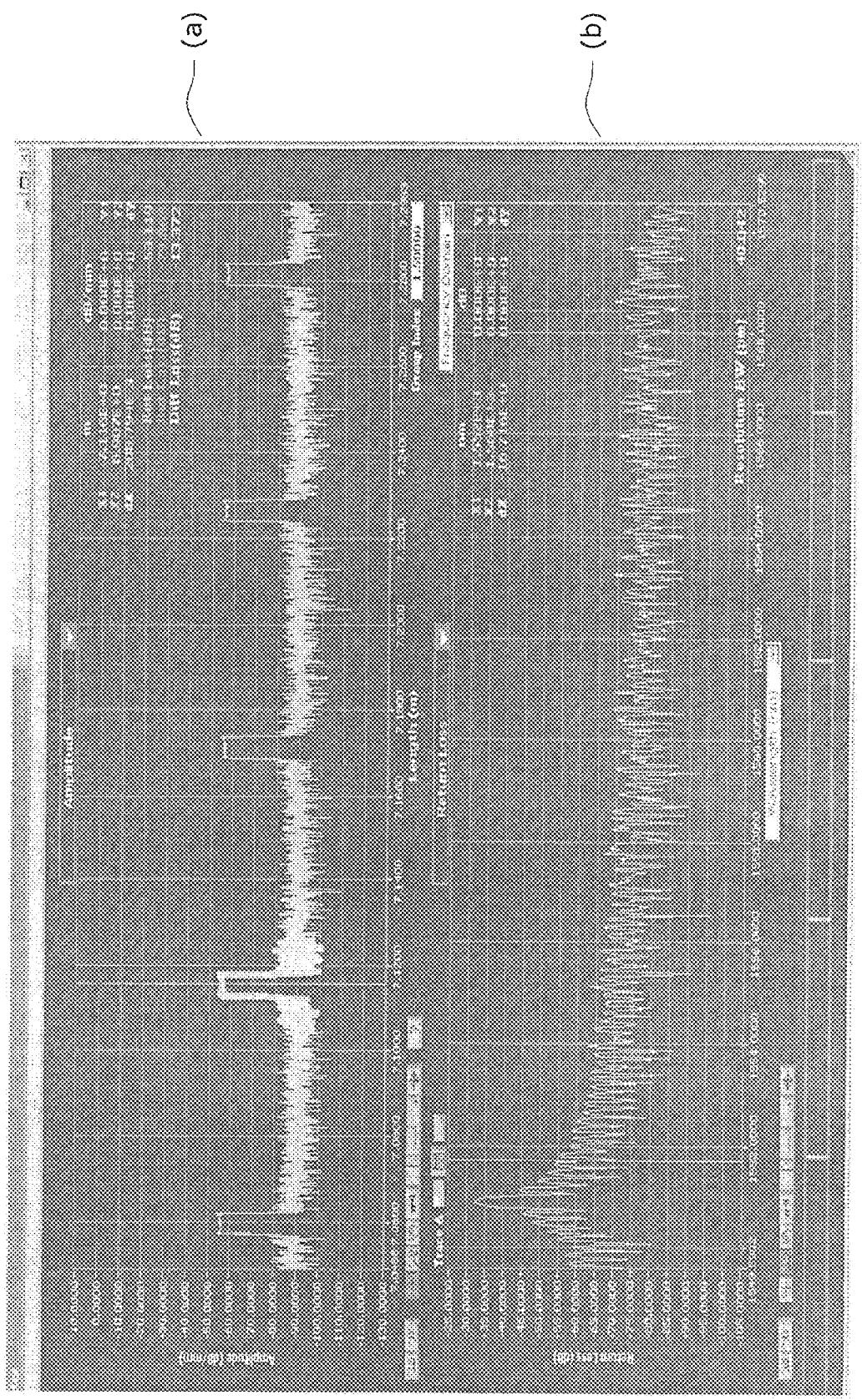
FIG. 9 contains two optical backscatter output plots, where

FIG. 8 contains a graph of the attenuation associated with a fiber Bragg grating structure formed in accordance with the present invention and aged in a hydrogen ambient at 200° C. over a period of ninety days. The measurements are associated with two different Bragg gratings. As shown, the values are less then 10 dB/km in the 1500-1600 nm range. The experimental fiber comprises 1000 gratings of 5 mm in length, with a spacing of one meter between gratings. FIG. 9 illustrates output plots from an optical backscatter reflectometer, showing in plot (a) a plurality of gratings formed along a length of about three meters. Plot (b) shows, in particular, the frequency response associated with an exemplary grating formed in the hydrogen-resistant optical fiber formed in accordance with the present invention. FIG. 10 illustrates a plot of the changes in hydrogen resistance as a function of time for an inventive Bragg fiber grating formed in accordance with the present invention. As mentioned above, downhole applications require for the fiber characteristics to remain stable over a long period of time, where hydrogen-induced losses were seen to increase in a conventional fiber over just a twenty-four hour time period. Referring to FIG. 10, the hydrogen-induced losses in the 1500-1600 nm wavelength range are plotted for an ambient temperature of 200° C. over a period of fifty-five days. It can be seen that losses do increase initially (over a forty day period of time), but then saturate to a value of approximately 15 dB/km and remain constant thereafter.

Rayleigh backscattered light can also be used to measure strain and temperature by monitoring the spectrum of the backscattered light from the Bragg grating. This can be done with an optical frequency domain reflectometry (OFDR) system. While the OFDR system is very sensitive and can monitor very weak signals, the use of the hydrogen-resistant fiber for Rayleigh backscatter measurements will improve the signal levels by providing slightly more scattering and lower losses at temperature and with hydrogen ingress. The hydrogen-resistant fiber of the present invention is also advantageous for monitoring the Raman and Brillioun backscattered light for OTDR-based distributed temperature and strain systems in high temperature and hydrogen-rich environments.

Although the invention has been described by way of exemplary embodiments, it should be understood that many changes and substitutions may be made by those skilled in the art without departing from the spirit and the scope of the invention which is defined only by the appended claims.

What is claimed is:

1. A hydrogen-resistant optical fiber comprising a pure silica core exhibiting a known refractive index and having a substantially large diameter;

a depressed-index cladding layer disposed to surround the pure silica core, the depressed-index cladding layer including a refractive index-lowering dopant; and a germanium-doped interface region disposed between the pure silica core and the depressed-index cladding layer and having a refractive index greater than the pure silica core, wherein the thickness of the germanium-doped interface region is less than the diameter of the pure silica core such that at least 65% of a propagating signal's optical energy is confined within the pure silica core and is not affected by the intrusion of hydrogen into the germanium-doped interface region.

2. The hydrogen-resistant optical fiber as defined in claim 1 wherein the fiber further comprises an outer cladding layer surrounding the depressed-index cladding layer.

3. The hydrogen-resistant optical fiber as defined in claim 1 wherein the depressed-index cladding layer is substantially thicker than the germanium-doped interface region.

4. The hydrogen-resistant optical fiber as defined in claim 1 wherein the depressed-index cladding layer comprises a fluorine-doped silica glass.

5. The hydrogen-resistant optical fiber as defined in claim 1 wherein the depressed-index cladding layer comprises a boron-doped silica glass.

6. The hydrogen-resistant optical fiber as defined in claim 1 wherein the germanium-doped interface further comprises an element selected from the group consisting of: Sb, Hf, Ta, P, Al, S Bi, Pb, In, Ga and La.

7. The hydrogen-resistant optical fiber as defined in claim 1 wherein the optical fiber includes at least one Bragg grating formed along a predetermined length of the fiber within the germanium-doped interface region.

8. The hydrogen-resistant optical fiber as defined in claim 7 wherein the at least one Bragg grating comprises a plurality of Bragg gratings, each grating having different characteristics.

9. The hydrogen-resistant optical fiber as defined in claim 7 wherein the at least one Bragg grating is configured to monitor Raleigh backscattering reflections along the length of the optical fiber.

* * * * *